Sept. 27, 1938.  F. M. BROOKE  2,131,216
EXTERNAL COMBUSTION ENGINE
Filed Dec. 4, 1935  7 Sheets—Sheet 1
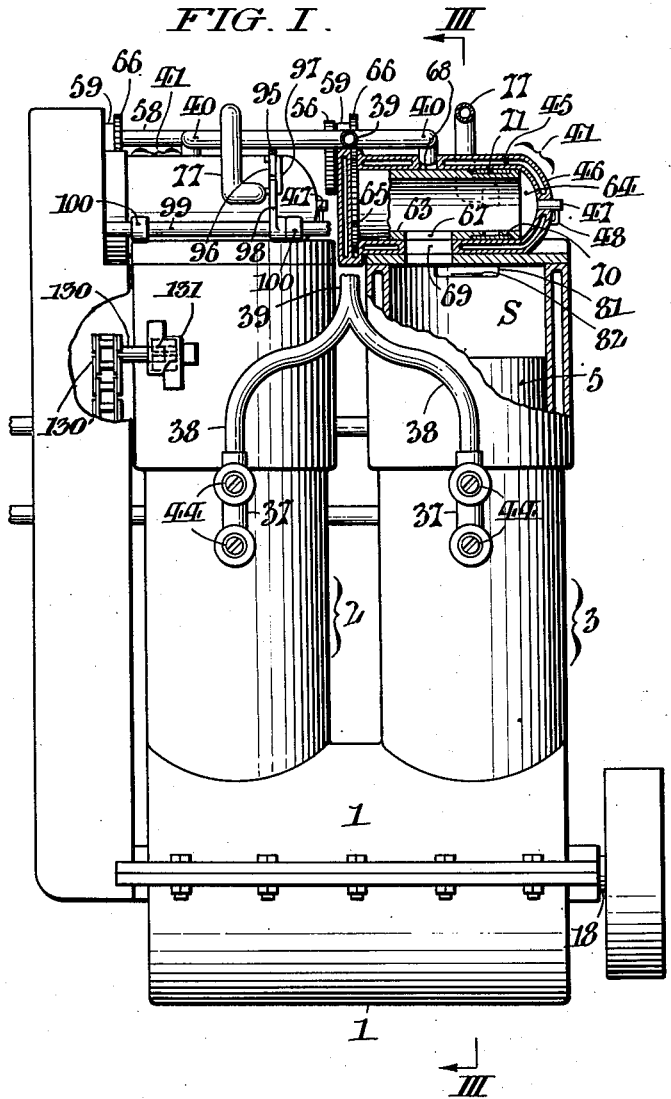
WITNESSES:
John A. Weidler
William Bell, Jr.
INVENTOR:
Francis M. Brooke,
BY Fraley & Paul
ATTORNEYS.

Sept. 27, 1938.  F. M. BROOKE  2,131,216
EXTERNAL COMBUSTION ENGINE
Filed Dec. 4, 1935  7 Sheets-Sheet 2
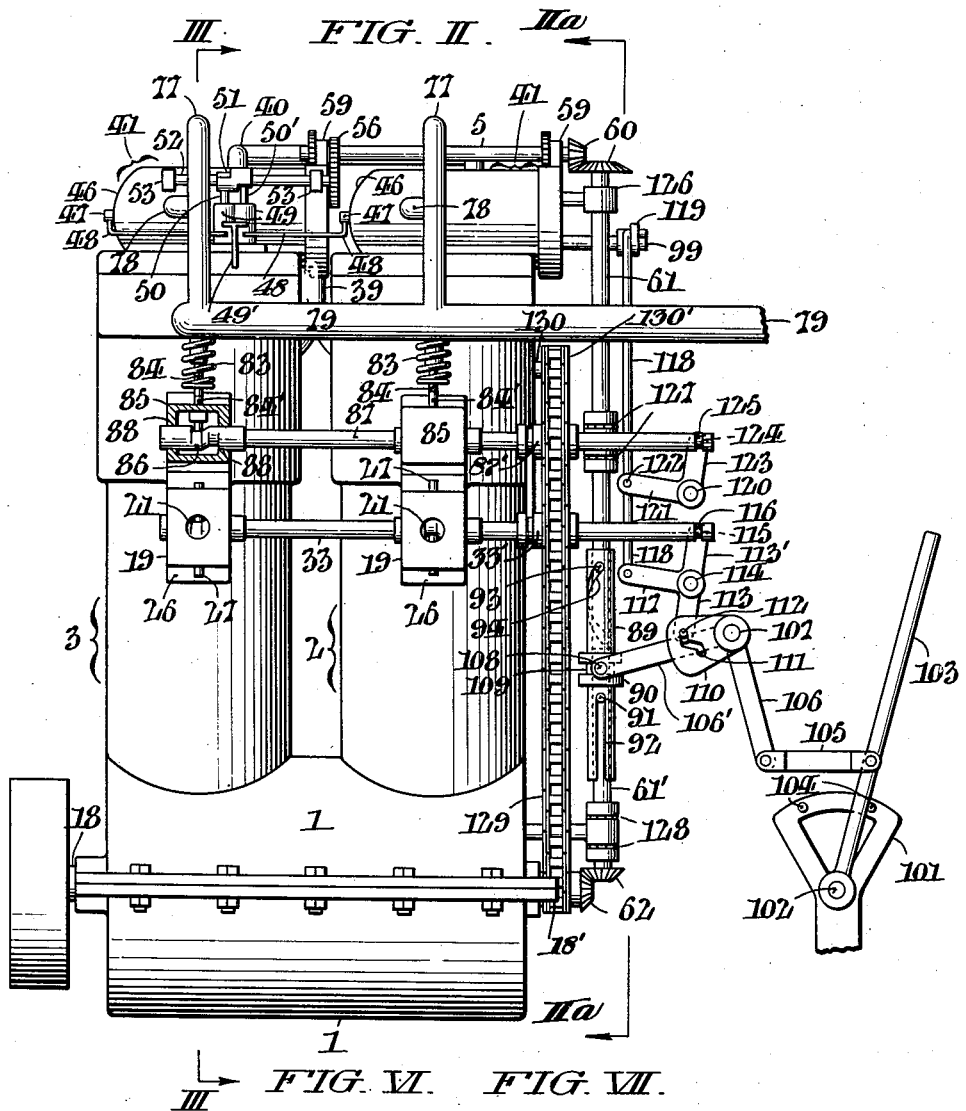
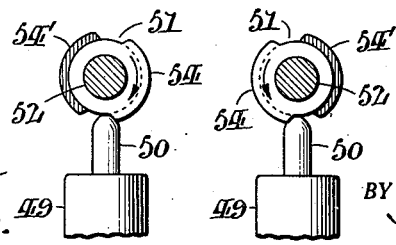
WITNESSES:
John A. Weidler
William Bell, Jr.
INVENTOR:
Francis M. Brooke,
BY Frailey Paul
ATTORNEYS.

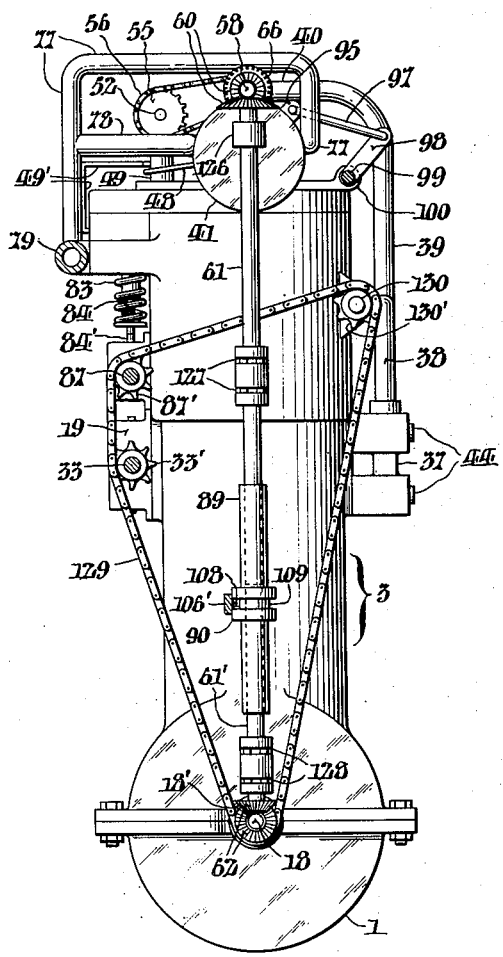

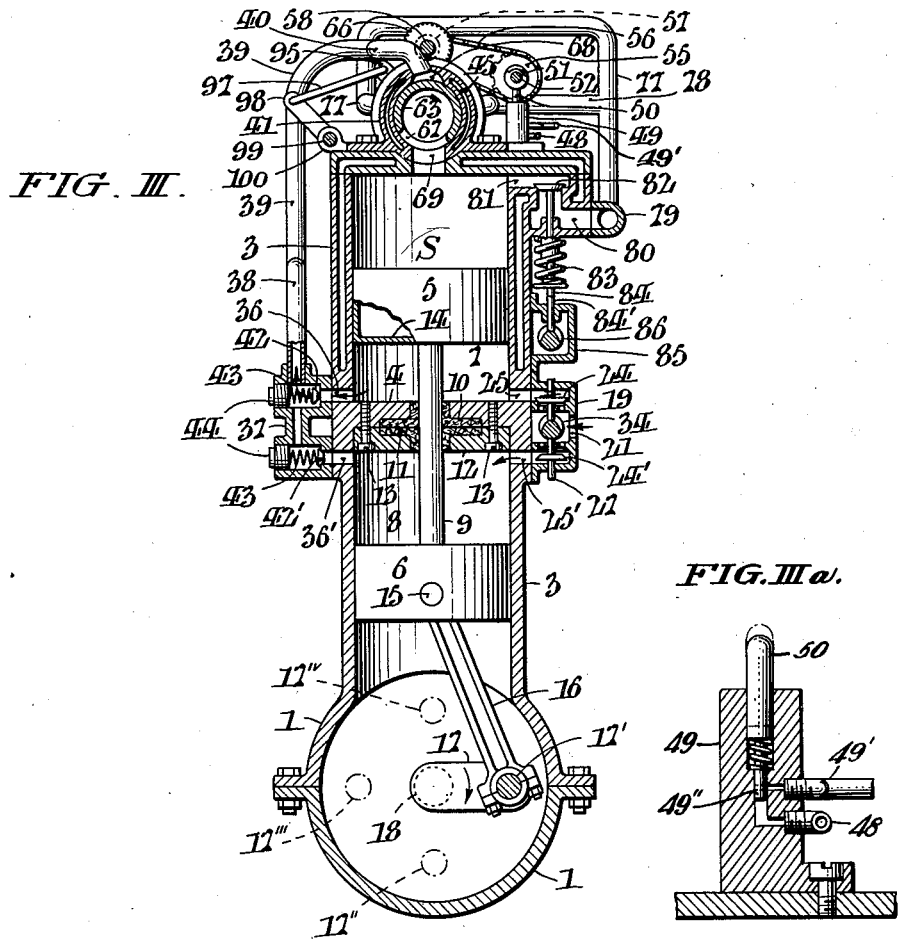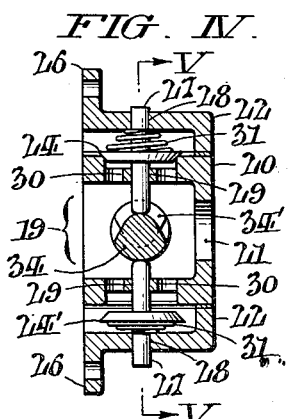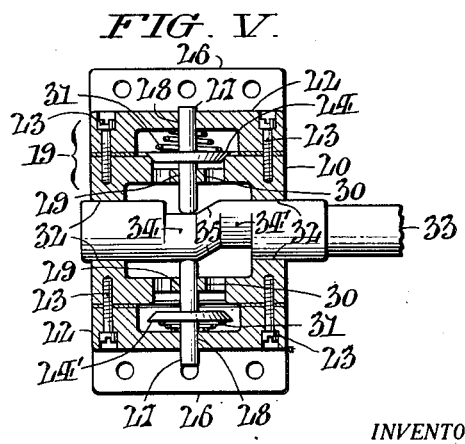

FIG. VIII.
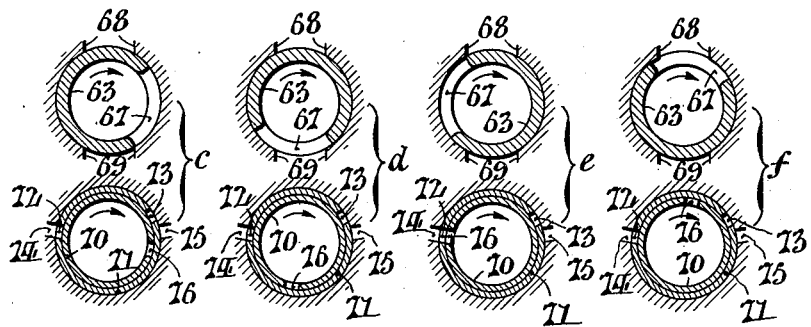
FIG. IX.
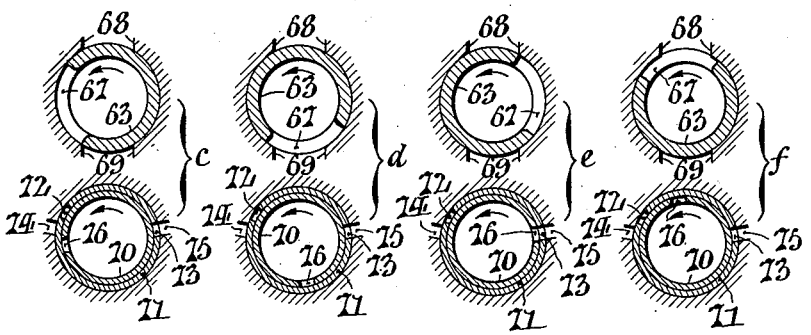
FIG. X.
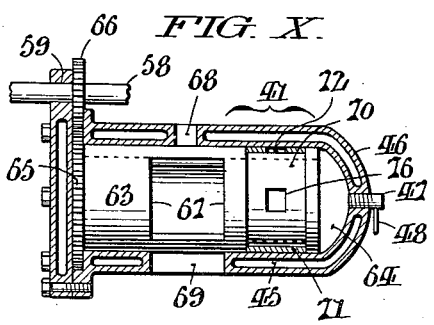
FIG. XI.
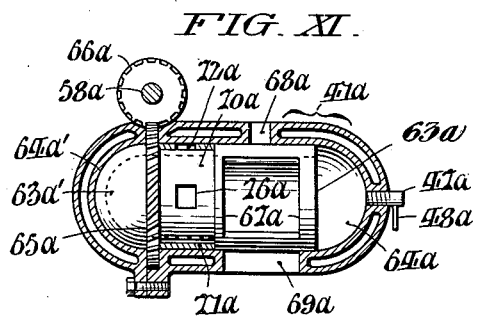
INVENTOR:
Francis M. Brooke,
ATTORNEYS.

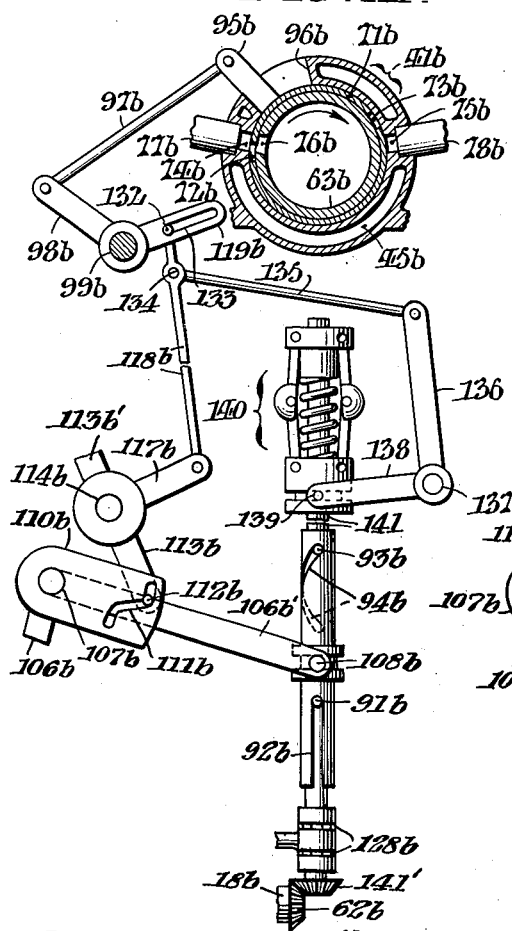

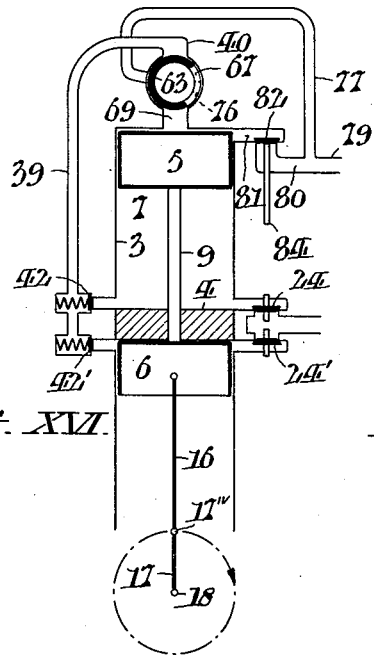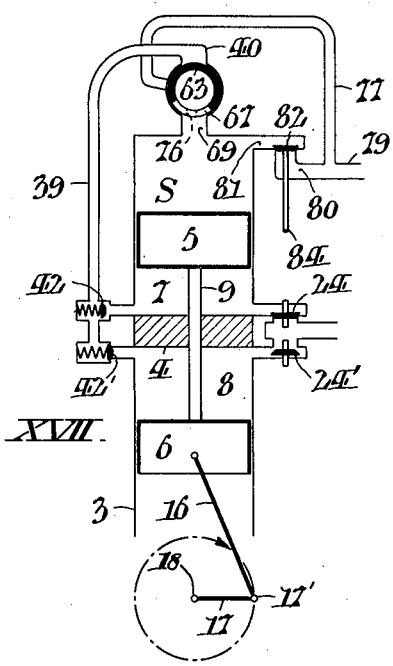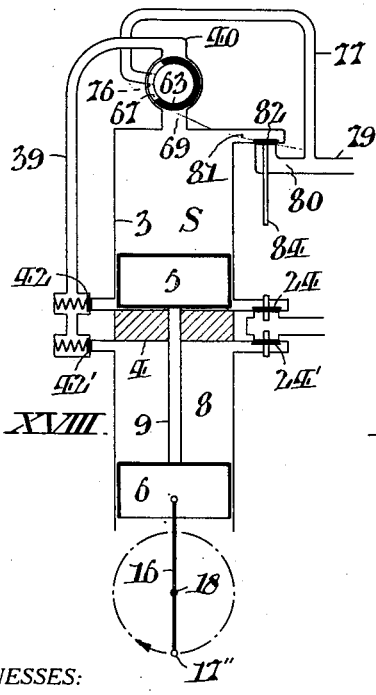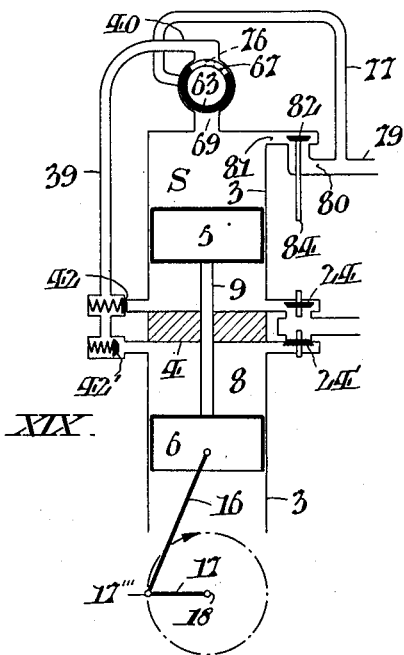

Patented Sept. 27, 1938

2,131,216

UNITED STATES PATENT OFFICE 2,131,216

EXTERNAL COMBUSTION ENGINE

Francis M. Brooke, Bryn Mawr, Pa., assignor to Nanna S. Brooke, Bryn Mawr, Pa.

Application December 4, 1935, Serial No. 52,824

14 Claims. (Cl. 60—44)

This invention relates to external combustion engines and has for a general object the provision of an improved construction involving features of novelty whereby the efficiency is greatly enhanced; flexibility of control is positively obtained; and reversibility, while the engine is operating, is ensured without interfering with the prevailing power output or necessitating temporary cessation of the operating cycle; while the instant subject-matter is, in part, a continuation of my prior application for a patent, filed May 24, 1934, under Serial No. 727,221.

It is a well-known fact that two-cycle combustion engines involve an explosion of the combustible for every revolution of the crankshaft, whereas four-cycle engines only require one explosion for each two complete revolutions of the crankshaft. The present invention fundamentally differentiates over such known modes of operation by the provision in a two-cycle engine, of external combustion chambers which, given a predetermined number of cubic inches of piston displacement and revolutions per minute, developes twice the power of a corresponding four-cycle engine.

Another object is to effect a more complete "scavenging" of the cylinders of two-cycle external combustion engines, than has heretofore been possible of attainment, even in conventional four-cycle engines, whereby an equal or greater charge of the combustible can be exploded at each consecutive revolution of the crankshaft.

Further objects are to attain better speed control and ease in reversing the engine by varying the position of a rotary sleeve valve relative to the piston position; and to attain more complete expansion of the exploded charge by a later opening of the exhaust valve.

The above stated, and other, objects are attained in general by the provision of an external combustion engine having atmospheric air pumped under compression to isolated combustion chambers whereinto the combustible is injected and exploded for direct controllable-release into associated cylinders for variable motivating purposes.

This invention further comprises an external combustion engine distinguished by double-acting pumps with a manifold common to the individual combustion chambers, exterior of the respective engine cylinders, and rotary means in each of the said combustion chambers for controllably releasing the products of combustion therefrom into the associated cylinders for variable expansion in the latter.

In the drawings:

Fig. I is a side elevation of one practical embodiment of the improved external combustion engine in accordance with this invention, the upper right-hand portion and an intermediate left-hand portion being shown in vertical section to better disclose otherwise hidden features of said invention.

Fig. II is a reverse side elevation of the engine and also showing a novel control mechanism, hereinafter fully explained.

Fig. IIa is a sectional view along the line IIa—IIa of Figure II.

Fig. III is a vertical section, taken substantially on the plane designated by the arrows III—III in Figs. I and II.

Fig. IIIa is an enlarged sectional view of a fuel pump hereinafter fully described.

Fig. IV is a relatively enlarged sectional view of a novel air inlet control mechanism, later on more explicitly described.

Fig. V is a vertical section, taken as indicated by the arrows V—V in the preceding illustration.

Fig. VI (Sheet 2) is a fragmentary detail of a cam-actuator means for the fuel pump as shown in Fig. IIIa for the injector devices embodied in the improved engine of this invention.

Fig. VII is a corresponding view but showing the cam-actuator means in the position it occupies when the engine is reversed.

Fig. VIII is a diagrammatic view illustrative of the respective positions of a combined rotary-valve and relatively-movable auxiliary-exhaust sleeve, which jointly control the inlet and outlet of motivating medium into and from the combustion chambers to the engine cylinders.

Fig. IX is a similar view showing the several positions occupied by the valve and sleeve when the engine is reversed.

Fig. X is an axial section through the novel construction of combustion chamber and rotary valve unit associated with each cylinder of the improved engine.

Fig. XI is a similar view of a modified construction of the combustion chamber and rotary valve unit.

Fig. XII is a detail view of a modified form of mechanism for automatically varying the position of the rotary valve sleeve in accordance with the engine speed.

Fig. XIII is a corresponding illustration to the preceding one but showing the effect of increased engine speed on the sleeve.

Fig. XIV is a broken view similar to Fig. XII, with parts removed, and illustrating how the mechanism is affected by reversal of the engine; and, Fig. XV is a like view, corresponding to Fig. XIII, but illustrating the effect of increasing engine speed thereon.

Figs. XVI, XVII, XVIII and XIX, are diagrams showing the relative positions of the pistons, cranks, valves and ports at quarter rotative points during the operative cycle of the engine.

In all the views corresponding parts are designated by like reference characters, and in order that the construction and operation of the improved external combustion engine of this invention may be fully understood, the same will now be described in detail with respect to the drawings.

The embodiment of this invention chosen for illustration herein comprises a two-cycle engine with a crank-casing 1 of conventional form, which is fitted with two surmounting cylinders 2, 3; and, inasmuch as said cylinders are substantially complemental in structure, one only will be hereinafter described in detail with corresponding reference characters, except where differences exist, applied to the other cylinder, in order to avoid repetitive explanation.

Each cylinder 2, 3 is divided by a partition 4 to provide, intermediate said partition and the pistons 5 and 6, upper and lower pump chambers 7, 8, respectively; while the pistons 5, 6 are connected for simultaneous operation by a rod 9 suitably secured thereto. The partition 4 is appropriately apertured for passage of the rod 9 and recessed at 10 for reception of suitable packing 11, conveniently held in place by a correspondingly-recessed gland device 12 and screws 13, in an obvious manner. The upper piston 5 sets apart in the cylinder a power or work section S thereabove, and has its lower end closed-in at 14, for a purpose later on explained; while the lower piston 6 is provided with a wrist-pin 15 and pitman connection 16, to the crank 17 of the engine crankshaft 18, in accordance with known practice.

Atmospheric air is admitted to the pump chambers 7, 8 of the respective cylinders 2, 3 by way of individual control devices, comprehensively designated 19 in Figs. II-V. Each of these control devices 19, as best appreciated from Figs. IV and V, comprises an intermediate air-inlet section 20, having an admission orifice 21 open to the atmosphere, or otherwise as desired, and outer sections 22 attached thereto by securing means 23; said sections 22 affording housings for suitable valves 24, 24' and having outlets connecting by way of inlet ports 25, 25', Fig. III, into the respective pump chambers 7, 8, as well as flanges 26 whereby the devices are attached to the cylinders 2, 3. The control valves 24 and 24' are preferably of the lift type, and each has an axial stem 27 slidibly engaged in apertures 28, 29, respectively provided in the wall of the sections 22 and spider-like portions 30 of the intermediate section 20; while they are both inwardly influenced by suitable springs 31, in an obvious manner.

Journaled in bearings 32 transversely of the devices 19 is an axially shiftable shaft 33, embodying diametrically opposed somewhat sectoral cams 34, 34' mutually mergent by inclines 35, for a purpose later on explained, and said cams coact with the valve stems 27, to effect lifting of the respective valves 24, as hereinafter set forth.

Conveniently opposed to the pump chamber inlet ports 25, 25' are outlet ports 36, 36' connecting into union devices 37, having outlet connections 38 merging into a common conduit 39, with lateral branches 40, appropriately fitted into the walls of the external-combustion chamber devices 41, individual to the engine cylinders 2, 3, and preferably mounted on top thereof, as shown in Figs. I-III. The union devices 37, are each fitted with valves 42, 42' respectively controlling the outlet ports 36, 36'; each such valve having an associated spring 43, adjustable as to its influence by means of a screw plug 44, in a manner clear from Fig. III.

Referring again to the external-combustion chamber devices 41, and more particularly to Figs. I, III and X, it will be observed that each such device embodies a jacketed cylinder 45 having one end closed-in and outwardly domed at 46, for attachment of an injector nozzle 47 with a fuel-feed connection 48 from a suitable pump 49, preferably of the type adapted for variation of its stroke and consequently the volume of fuel delivered to the respective cylinders in accordance with known practice, said pump being conveniently mounted on the cover of the cylinder 3, for example. The pumps 49, as best understood from Fig. IIIa, connect by a branch conduit 49' with a source of fuel oil supply under pressure; while the injector plungers 49'' control forced feed of the fuel oil by way of the connection 48 to the injector nozzles 47, in an obvious manner. These pumps 49 have projecting plunger stems 50, 50' for alternate actuation by a compound cam 51, on a transverse shaft 52, journaled in appropriate bearings 53, Fig. II, on each of the devices 41. The cam 51, as best understood from Figs. II, VI and VII, embodies axially spaced diametrically opposing active portions 54, 54' for coaction with the plunger stems 50, 50', respectively; while the shaft 52 is coordinated, by a spur gear 55 and endless drive 56, with a similar gear 57 on an overhead valve shaft 58, journaled in bearings 59 on the combustion chamber devices 41, said shaft 58 being operatively-coupled by a bevel drive 60, at one end, to a two-part vertical shaft 61, 61', in turn similarly geared at 62 to the engine crankshaft 18; while the part 61 is adapted for rotary advance relative to the part 61', for a purpose hereafter set forth.

Snugly fitting each combustion chamber device 41 is a rotary sleeve valve 63 extending lengthwise thereof with provision of a semi-spherical clearance 64 at the fuel injection end. Each sleeve valve 63 has its other end closed-in and formed as a gear 65, for meshing with a smaller gear 66 on the valve shaft 58, above referred to; and said valve is provided with a comparatively large port 67 in its cylindrical wall, intermediate the ends thereof, for alternate registration with the inlet port 68 of the cylinder 45, and a diametrically opposed outlet port 69 communicating into the associated engine cylinder 2 or 3, as later on set forth in greater detail. The rotary sleeve valve 63 is further provided with a circumferential reduction 70, remote from its geared end 65, for reception of a relatively movable auxiliary-exhaust control sleeve 71; said control sleeve having a pair of ports 72, 73 (Figs. VIII and IX) located circumferentially at a spacing of approximately one-hundred-and-sixty degrees (160°) for movement into registration with exhaust ports 74, 75, through the jacketed wall 45, as hereafter explained; while the circumferential sleeve valve reduction 70 has an auxiliary outlet port 76, for communicatory registration with the ports 72, 74 or the ports 73, 75 when the engine is running normal or reversed, respectively.

In the modified structure of external combustion chamber 41a shown in Fig. XI, corresponding parts to those previously described are designated by the same reference characters with an added exponent "a" to avoid repetitive descriptive matter; but it is to be noted that said chamber 41a is provided with two semi-spherical ends 64a and 64a' for a purpose later on explained. Furthermore, the rotary valve 63a is formed with a hollow end 63a' seating in the end 64a'; the gears 65a and 66a are of the worm-drive type; and the valve reduction 70a, for the auxiliary exhaust control sleeve 71a, is located adjacent the worm drive 65a instead of remote therefrom, as previously set forth. This structure of combustion chamber 41a is devised to reduce the ratio of cooling surface relative to the volume contained.

Leading from each of the auxiliary-exhaust ports 74, 75 of the external combustion chambers 41, are conduits 77, 78 communicating into an exhaust manifold 79 also common to the engine cylinders 2, 3, by way of suitable connections 80, attached to or formed integral with the respective cylinders. Each connection 80 communicates with an associated exhaust port 81, though the cylinder wall, and likewise houses a vertically movable poppet-valve 82, downwardly influenced by a spring 83 in accordance with known practice, with the stem 84 thereof extending into a box-like housing 85, conveniently located above and in vertical alignment with the axial stems 27 of the air-inlet control valves 24. Each poppet-valve stem 84 lower end coacts with a compound cam 86 (through the medium of a conventional tappet 84') similar to the sectoral cams 34, 34', hereinbefore referred to, and likewise attached to, or formed as integral parts of, an axially shiftable shaft 87, journaled in bearings 88 included in the housings 85.

Referring again to the two-part vertical shaft 61, 61', Fig. II, it will be seen the said parts 61, 61' are alignedly coupled by a sleeve 89 with a grooved collar 90 intermediate the outer ends thereof. The lower part of the sleeve 89 is axially slidable relative to the lower shaft section 61' by means of a pin-and-slot connection 91, 92, respectively, in an obvious manner; while the upper shaft section 61 is rotative relative to the lower secton 61', through the medium of a pin 93 in said upper section engaging a helical slot 94, through the upper portion of the sleeve 89, and later on operatively explained.

Referring again to the combustion chamber auxiliary-exhaust control sleeves 71, and in order to make provision whereby they can be simultaneously moved, relative to the rotary valves 63, each said sleeve 71 is provided with a radial arm 95 projecting through a slot 96 in the wall of the combustion chamber 41. The arms 95 are coordinated by links 97 to lever members 98 secured on a transverse shaft 99, journaled in bearings 100 on the respective cylinders 2, 3; said shaft 99 being operated and controlled in a manner later on explained in connection with Figs. XII–XV, inclusive.

In order that the several means and instrumentalities hereinbefore described may be operatively controlled and variably actuated, I preferably employ mechanism such as illustrated at the right-hand of Fig. II. This mechanism comprises a stationary quadrant 101 having pivoted thereto at 102 a control lever 103, conveniently limited in its movement by stops 104, said lever being connected by a link 105 to one arm 106 of a bell-crank fulcrumed at 107, and the other arm 106' whereof is provided with a pin 108 engaging in the circumferential groove 109 of the sleeve collar 90, hereinbefore referred to. Secured on the fulcrum 107 is a sectoral arm 110 having a stepped-slot 111 therethrough, in which is engaged a pin 112 projecting from one arm 113 of a T-shaped member pivoted at 114, and whose other arm 113' is provided with a similar pin 115 engaging a circumferential groove 116, in the proximate end of the axially shiftable shaft 33 operating the air-inlet control devices 19. The leg 117 of the T-shaped member in turn is connected by a link member 118, to the outer end of a lever arm 119 having its inner end secured on the shaft 99 that controls movement of the combustion chamber sleeves 71.

Pivoted at 120 is a bell-crank having one arm 121 operatively connected to the link member 118 at 122, and its other arm 123 provided with a pin 124 engaging a circumferential groove 125, in the proximate end of the axially shiftable shaft 87 controlling actuation of the exhaust valves 82.

126 and 127, 128 are, respectively, annular and thrust bearings supporting the two-part vertical shaft 61, 61'; and 129 is a chain drive from a spur gear 18' (see also Fig. IIa) on the crankshaft 18 for rotating the shafts 33, 87 by coaction with spur gears 33', 87', respectively feathered thereon, as well as the shaft 130 by a gear 130' of a suitable rotary pump 131 for circulating cooling water through the cylinder and combustion chamber jackets, see Fig. I more particularly, in accordance with known practice.

Referring to the modified form of control mechanism illustrated in Figs. XII–XV, inclusive, parts corresponding to those previously described are designated by the same reference characters with an added exponent b, in order to obviate unnecessary repetitive explanation; while it is to be expressly understood the following explanation applies, in part, to the structures of Figs. I, II and III, insofar as the operation of the valve sleeve 71 is concerned. It is to be particularly remarked, however, that with this form of control mechanism for the exhaust valve sleeve 71b, provisions are included whereby said sleeve is variably rotated in accordance with the engine speed. These provisions consist in coordinating the link member 118b, at its upper end, by a pin-and-slot connection 132, 133, to the lever arm 119b; and also connecting the link member 118b, at a convenient point 134, by a rod 135 to one arm 136 of a bell-crank fulcrumed at 137, and the other arm 138 whereof is conventionally coupled at 139 to a centrifugal governor 140, on a shaft 141, in turn, rotated by a bevel gear 141' from the bevel gear 62, Fig. II, and at the same speed as the engine crankshaft 18; as will be well understood by those conversant with the art. It is also to be understood that the connections from the axially shiftable shafts 33 and 87 to the link member 118b are, as before described in connection with Fig. II, to coordinate all the various relatively movable instrumentalities with the common control lever 103, which is manipulated in an obvious manner.

Referring to Figs. XIII and XIV, which show the auxiliary control sleeve 71b in intermediate positions, it is to be remarked said drawings are illustrative of how the port openings 72b, 73b are "advanced" or "retarded" in relation to the engine speed. At low engine speed it is desirable that the exhaust port 76b in the sleeve 63b should close rapidly when the port 67, Figs. VIII and IX, commences to uncover the cylinder inlet 68 for admission of air under pressure to the combustion chamber 41, and thereby prevent a loss of pressure through the port 76b. This is effected by retarding the control sleeve 71b automatically under action of the governor means 140, so that as the engine speed reduces, the port 76b will be correspondingly closed earlier. When the engine is running at maximum speed, the ports 74b, 72b and 76b, will also be at maximum opening so as to ensure thorough scavenging of the spent gases aided by pressure of the incoming air.

Having described the structural aspects of the invention, its cyclic action will now be set forth, having reference more particularly to the diagrammatic showings of Figs. VIII, IX and XVI–XIX, inclusive, in order to clarify the operation; and, wherein it is to be remarked that the upper row of sections in each of Figs. VIII and IX, are taken through the combustion supporting air inlet and main exhaust ports 68, 69, of the external combustion chambers 41, whereas the lower row of sections in each of said figures are taken through the auxiliary exhaust ports 74, 75 of said combustion chambers, and both rows of sections schematically indicate the respective positions concurrently occupied by the rotary valve 63 or 63a, and the relatively movable auxiliary exhaust control sleeve 71 or 71a, with respect to the engine pistons 5, 6, for each successive quarter revolution of the crankshaft 18.

Assuming first that the engine piston 5 is at its uppermost position, Fig. XVI, the rotary sleeve valve 63 and auxiliary exhaust-control sleeve 71, will occupy the positions shown in the bracketed sections designated c in Fig. VIII; that is to say, the valve port 67 is just about to open relative to the cylinder inlet port 69 for admission of an exploded charge from the combustion chamber 41 into the work section S of the cylinder 3, for example: and, it will also be observed that the auxiliary exhaust outlet port 76 is out of registration with any one of the ports 72—75. Furthermore, it will be understood that the exhaust poppet valve 82, and air inlet control valve 24, have been concurrently closed under the action of their respective cams 34 and 86; while as the piston 5 descends under expansion of the exploded charge the control valve 24' will be simultaneously opened for inflow of atmospheric air by way of the orifice 21 and inlet port 25' to the lower pump chamber 8.

When the rotary sleeve valve 63 has completed a quarter revolution to the right-hand, or in the direction of the arrows in Figs. VIII and XVII, said rotary sleeve valve 63 will have turned to the position indicated by the bracketed section d in said figures, with the piston 5 downwardly moved in the cylinder 3; or in other words, the valve 63 will have moved towards the position where it will commence to shut-off the inlet port 69 into the cylinder 3; while the auxiliary exhaust port 76 is still out of registration with the ports 72, 74. Concurrently, the exhaust valve 82 and air inlet control valve 24 have remained closed with the air inlet valve 24' open, and the valve 42' closed, all as shown in Figs. III and XVII.

Somewhat similarly as the crankshaft 18 and rotary valve 63 continue motion through the next quarter revolution, or the crank-pin 17' advances from the full line showing of Fig. III to the dot-and-dash indication 17'' in said view, the rotary valve 63 will have been turned to the position indicated in the bracketed section e of Fig. VIII or as illustrated in Fig. XVIII. In this position it will be seen that the port 67 is just about to commence registration with the air inlet port 68, while the auxiliary exhaust port 76 has been moved into full registration with the ports 72, 74; with retention of the exhaust valve 82, and air inlet control valve 24 in closed position until just before the crank-pin 17' reaches the lower dead-center marked 17'''; while the air compressed below the piston 5 in the pump chamber 7 has been driven out by way of the valve 42 into the manifold pipes 38—40, Figs. I and XVI–XIX, for charging the combustion chamber 41 above the cylinder 2.

During the succeeding quarter revolution of the crankshaft 18, as the crank-pin 17' moves from the lower dead-center 17'' to the position designated 17''', Figs. III and XIX, a new charge of atmospheric air under compression will be expelled from the pump chamber 8 by the lower piston 6, through the port 36' past the valve 42', into the manifold connection 38—40 and the combustion chamber 41 above the cylinder 3, incident to concurrent rotation of the sleeve 63 from the position indicated in the bracketed section e to that similarly bracketed as f. It will thus be clearly apparent that during initial opening of the port 68 for admission of the compressed air, as aforesaid, that the combustion chamber 41 will be completely "scavenged" thereby, or until the auxiliary exhaust port 76 moves out of registration with the ports 72, 74.

Now as the crank-pin 71' moves from the position marked 17''' to that designated 17$^{IV}$, Figs. VIII and XVI, or the upper dead-center point, the rotary valve 63 will be turned from the bracketed section showing f to that of c, and during such movement it will be evident that the compressed air above the piston 5 will be driven into the combustion chamber 41 of the cylinder 3 to form the succeeding explosive charge, and thereby complete the operative cycle of said cylinder; while a fresh charge of atmospheric air will be drawn in below the piston 5 by way of the control valve 24, ready for compression and transfer to the combustion chamber 41 above the cylinder 2, during the next half-revolution of the crankshaft 18.

It will, of course, be understood the respective cranks for the two engine cylinders 2, 3 are set at one-hundred-and-eighty degrees (180°) so that, as the crankshaft 18 rotates and the piston 5 is descending in the cylinder 3, for example, the piston 5 in the cylinder 2 will be ascending; hence, while the atmospheric air in the one pump chamber 7 is being compressed, the other pump chamber 8 will be drawing in fresh air; with a reversed or suction-compressive action taking place in the corresponding pump chambers 7, 8 of the engine cylinder 2. Furthermore, it should be noted that when either combustion chamber 41 is charged, that it is temporarily sealed for ignition and thereafter the ports 67, 69 open so that the pressure of the explosion exerts its full force on the head of the piston 5 which has just passed its upper dead-center. As each piston 5 reaches its lower limit of stroke, the associated exhaust valve 82 is lifted by the sectoral cam 86, whereupon the expanded gas products are swept out, of the cylinder 2 or 3, by way of the port 81, as the respective pistons 5 again ascend. Again, it is to be noted each exhaust valve 82 remains open through the entire up-stroke of the associated piston 5, so that the cylinders 2, 3 are completely "scavenged" by the pump action of said pistons; also as each piston attains the upper limit of its stroke the valve 82 will commence to close under action of the spring 83 and release of the upward pressure exerted by the cam 86, due to rotative movement past its high point, as clearly apparent from the foregoing descriptive matter relating to said cam. Incidentally, in constructing the improved engines, no "clearance" is required in the actual cylinder space for each piston 5, other than that absolutely essential for preventing said piston from striking the cylinder head, as well as due allowance for expansion and "moderate carbon", any excess carbon being pounded free and carried out by way of the exhaust 81, in an obvious manner, while the piston space or work section S is swept out completely and thoroughly "scavenged", as the cam means 86 is so shaped to hold the valve 82 open until the piston 5 attains its highest limit of stroke. It should be further noted each combustion-chamber 41 is completely isolated from the piston space therebelow due to the "setting" of the rotary valves 63 relative thereto. The valve 63 normally rotating clockwise closes its port 69 before the piston 5 in the cylinder 2 commences its up-stroke, while the charge in the combustion chamber 41 over the cylinder 3 is sealed therein and ignited. After the explosion, the rotary valve 63 turns until the port 67 registers with the port 69, so that the full pressure of such explosion exerts its complete expansive force on the piston 5, that is just commencing its downward movement concurrent with opening of communication through the ports 67, 69. After the auxiliary exhaust port 72 has been opened through an angle of fifteen degrees (15°) rotation, for example, of the sleeve valve 63, the air-inlet port 68 commences to open and "scavenge" the combustion chamber 41 thoroughly, driving out therefrom any remaining dead gas. The auxiliary exhaust port 72 continues open for a total of thirty degrees (30°) rotation of the sleeve valve 63, for instance, and during the last fifteen degree (15°) movement, the port 68 has been in process of opening; while said port 68 continues to open and remains fully open, during approximately one-hundred-and-sixty degrees (160°) rotative movement of the valve 63, for admission of the combustion supporting atmospheric air under pressure, whereupon the valve 63 closes the port 68 and seals the combustion chamber 41, for ignition and subsequent explosive power effect in the succeeding cycle. In other words, each combustion chamber 41 is charged while the associated piston 5 is ascending, so that an explosion is effected during every down-stroke of said piston.

By reference to Fig. I, it will be seen the pipes 38, 38 converge into a common conduit 39 having branches 40 leading to the respective combustion chamber air inlet ports 68, and it will be readily understood that, irrespective of the number of engine cylinders 2, 3 involved, by having automatic inlet valves 42, 42', the volumetric capacity of the piping 38—40 to the ports 68 can be reduced in relation to the internal capacity of the combustion chambers 41, and vice versa if desirable or expedient. Furthermore, such provisions permit, when there are more than two cylinders 2, 3, of always having one inlet port 68 open as one piston 5 is approaching the bottom of its stroke and developing its highest compression.

It is to be further remarked, on reference to Fig. III more particularly, that instead of using the engine crank-case 1 for compression purposes, that there is provided by the partition 4 in the cylinders 2, 3, what may be termed a double-acting pump constituted by the upper cylinder chamber 7 utilizing the closed-in end 14 of the piston 5 as a plunger, while the lower cylinder chamber 8 is similarly served by the piston 6; whereby there is attained a compression pulse with every down-stroke, as well as on every up-stroke of the connecting-rod 9, and hence the amount of air compressed for each operative cycle is doubled. By use of the double-acting pump effect just referred to, not only is twice the volume of air compressed, but there is likewise furnished an air-cushion for the up-stroke of each piston 5 utilizing its "inertia". Again, while an engine with only two cylinders 2, 3 is illustrated, this invention contemplates the use of a multiplicity of such cylinders; and while air under pressure is being constantly forced into the manifold branches 40, it will, likewise, be continuously absorbed by the additional combustion chambers 41, as the rotary valves 63 therein successively open in sequential relation.

To slow down the engine, the crankshaft 18 turning clockwise and the rotary valve 63 in the same direction, the latter will be relatively moved clockwise the requisite number of degrees that it is desired to have the crankshaft 18 advance before applying the effort. By continuing such movement of the rotary valve 63, the work space S in each cylinder 2 or 3 becomes, in effect, a cushion or brake for the crankshaft 18: also, with further continuation of such rotation of the valve 63, within the limits of the control lever stops 104, there will be effected a reversal of rotation of said crankshaft. Briefly, the engine is reversed by continued turning of the rotary valve 63 or 63a in one direction so as to reduce the engine speed and, on passing a certain point corresponding to what would otherwise be a "dead" stop, exerting a correspondingly increasing effort in the opposite direction. But, as the engine speed is decelerated in one direction to the point of no velocity, it is simultaneously building up accelerative force in a reverse degree; that is to say "acceleration" is transferred from positive into negative effort. Furthermore, as the direction of rotation of the crankshaft 18 is effected, so will rotation of the valves 63 be correspondingly brought about by the two-part shaft 61, 61' and associated mechanism, hereinbefore explained. In practice, during "reversal" of the engine, it is not actually brought to a dead stoppage, but, as the momentum is diminished, in one direction, until the point of reversal is reached, said momentum is being correspondingly taken up as reversing effort. Hence, the "stop" period is only transitory and involves no restarting effort for reversal of the engine movement. In other words, no external starter device or means is needed in connection with the improved engine of this invention, as the reversing transition is solely effected by relative rotary movement between the valve 63 and the control sleeve 71. The change in the direction of rotation of the valve 63 requires a difference of three-hundred-and-sixty degrees (360°) less the number of degrees occupied by the rotary valve exhaust port 67 to obtain the same relative position to cylinder inlet port 69; that is if the direction of adjustment of the rotary valve 63 be instantly reversed. The sleeve 71 which automatically controls the size of the port opening for the auxiliary exhaust 76, serves to effectively prevent any fall in pressure while the engine is running slowly. However, by changing the direction of adjustment of the rotary valve 63, speed variations while the engine is running, are obviously much more smoothly and positively effected than heretofore. The "flexibility" of the engine is thus increased beyond any point heretofore attainable by simply "advancing" or "retarding" the admission of the products of combustion to the piston according to its relative position, as a result of turning the rotary valve 63 through a greater or smaller angle as desired.

Referring again to the two-part shaft 61, 61' and the two-way shaft advance-sleeve 89, it will be readily understood the section 61 can be turned in either direction relative to the section 61', while the crankshaft 18 is stationary; and that said section 61 may be turned in either direction irrespective of the speed at which the crankshaft 18 is rotating, by simple movements of the control lever 103. This provision, obviously, enables advance or retarding of the respective rotary valves 63, whereby the engine of this invention is rendered not only extremely flexible, irrespective of how high the compression may be, but also makes it reversible with perfect ease while running. In either case, since the bevel gears 62 hold the lower shaft section 61' in definite operating relation, the upper section 61, which is similarly coordinated by the gears 60 to the valve shaft 58, it naturally follows that the latter must follow the rotative direction of the crankshaft 18. Thus the valves 63 are synchronously advanced or retarded by adjustment of the control lever 103, and in practice the crankshaft 18 may be thus driven clockwise or counter-clockwise, while at the same time permitting valve advance or retardation both ways. Supposing the engine is running with the crankshaft 18 rotating in a clockwise direction and the port 67 in the valve 63, of the combustion chamber 41, just opening communication into the work space S, with the piston 5 at its upper limit of travel or the crank 17 at "top" dead center 17$^{IV}$, such positions of the named parts being productive of maximum power. Now assuming it is desirable to reverse the direction of crankshaft rotation, the first thing to be done is to reduce the engine speed and power by retarding the valve 63 so that its port 67 opens into the space S when the piston 5 is well on its downward stroke. This retarding of the valve is accomplished by progressive angular movement of the control lever 103 from the position shown in Fig. II towards the left-hand of said figure; such movement through the connection 105, bell crank 106, 106' shifting the sleeve 89 to vary the relation of the shaft components 61, 61'. Now it will be apparent that if the opening of the port 67 of the rotary valve 63 could be arrested until the crank 17 passed the bottom dead center 17'', and was then allowed to open into the space S, the pressure of the exploded gases in the combustion chamber 41 will then exert a force on the piston 5 in opposition to its upward movement. This opposing force first arrests upward movement of the piston 5, and then exerts a downward force sufficient to bring the piston of the second cylinder over past the "top" dead center of its crank to initiate the reverse operating cycle of the engine. It is this opposing force result, accomplished by gradual movement of the lever 103, that further retards the rotary valve 63 by varying its "timing" with respect to the piston movement, so that it will be exactly the same if the direction of the engine rotation were reversed. Obviously, when the engine is reversed, gradual movements of the lever 103 away from the left-hand stop 104 of Fig. II, towards the right hand, will first decrease the speed in one direction until the lever 103 has passed the mid-point whereupon there will be a gradual increase in speed in the opposite direction, or for the reverse running of said engine.

From the foregoing description and a study of Fig. IX, the relative positions of the rotary valves 63 and auxiliary-exhaust control sleeve 71 effected by movement of the control lever 103 and associated mechanism, to place the engine in reverse, will be readily understood by those acquainted with the art. Further, while the automatic variable control of the position of the rotary sleeve valves 63 under the action of the centrifugal governor 140, Figs. XII–XV, will also be equally apparent from the preceding description of said figures.

In conclusion, while the invention has been described in detail with reference to a present preferred embodiment which it may assume, it is not to be limited to such form or precise construction, since many changes and modifications are feasible without departing from the spirit or scope thereof in its broader aspects. Hence it is desired to cover any and all forms or modifications of the invention that may be readable into the language and scope of any one or more of the following claims.

Having thus described the invention, I claim:

1. In an external-combustion engine having multi-cylinders, each said cylinder being subdivided to provide pump chambers with a work section independent therefrom, spaced pistons in each cylinder serving the pump chambers and one of which also operates in the work section, an external combustion chamber for each cylinder work section, means for supplying combustible under pressure to the combustion chambers, a common manifold connection from the pump chambers for the reception of fresh air and supply of the same to the combustion chambers for effecting ignition of the combustible supplied thereto, and valve means individual to said combustion chambers for variably controlling release of the products of combustion into the work sections of the associated cylinders, said valve means including a relatively movable control whereby auxiliary scavenging of the combustion chambers is effected.

2. In an external-combustion engine having multi-cylinders, means in each cylinder defining axially-aligned pump chambers with an expansion section independent therefrom, spaced pistons in each cylinder serving as plungers for the pump chambers and one of which also operates in the expansion section; an external combustion chamber for each cylinder expansion section, means supplying suitable combustible under pressure to the combustion chambers, a common manifold connection from the pump chambers for the reception of fresh air and supply of the same to the combustion chambers for effecting ignition of the combustible supplied thereto, and valve means individual to said combustion chambers for variably controlling release of the products of combustion into the expansion sections of the associated cylinders, said valve means including a relatively movable automatic control whereby the amount of auxiliary air for scavenging of the combustion chamber is effected.

3. In an external combustion engine having multi-cylinders, means in each cylinder defining axially-aligned pump chambers with an expansion section independent therefrom, spaced pistons in each cylinder serving as plungers for the pump chambers and one of which also operates in the expansion section; an external combustion chamber for each cylinder expansion section, means supplying combustible fuel under pressure to the combustion chambers, a common manifold connection from the pump chambers for the reception of fresh air and supply of the same to the combustion chambers for effecting combustion of the combustible supplied thereto, a rotary valve in each combustion chamber with a relatively movable apertured member controlling scavenging of said chamber, means coordinating the valves for simultaneous operation, and means whereby said valves can be turned in relation to the piston position for variably controlling release of the products of combustion into the work sections of the associated cylinders.

4. In an external-combustion engine having multi-cylinders, partition means intermediate the ends of each cylinder defining axially aligned pump chambers with an independently located expansion section, spaced pistons in each cylinder serving as plungers for the pump chambers and one of which also operates in the expansion section, an external combustion chamber for each cylinder expansion section, means for supplying and injecting suitable fuel oil into said chamber, a common manifold connection from the pump chambers for the reception of atmospheric air and supply thereof to the combustion chambers for igniting the fuel oil injected therein, a cylindrical valve in each combustion chamber with a relatively movable ported sleeve controlling scavenging of said chamber, means coordinating said valves for rotation in unison, and means whereby said valves may be rotatively shifted in relation to the piston position for variably controlling release of the products of combustion into the work sections of the associated cylinders to increase the operating flexibility as well as aid in reversing the engine.

5. In a two-cycle engine, multi-cylinders having external-combustion chambers, means for supplying and injecting suitable fuel oil into said chambers, means in each cylinder defining axially-aligned pump and expansion chambers, said pump chambers being set apart by a stationary head intermediate spacedly-connected pistons, one of said pistons being operative in the expansion chamber and the other including a wrist connection to the engine shaft, mechanically actuated valves controlling admission of atmospheric air into the respective pump chambers, a common manifold with individual branches to the several combustion chambers, valves whereby atmospheric air is admitted to the pump chambers for compression and automatic supply to said manifold, and rotary means in each combustion chamber including a relatively movable sleeve member for respectively controlling release of the products of combustion therefrom into the expansion chamber of the associated cylinder and effecting scavenging of the combustion chamber.

6. In a two-cycle engine, multi-cylinders having external-combustion chambers at one end thereof, means for supplying and injecting combustible fuel into said chambers, means in each cylinder defining axially-aligned pump and expansion chambers, said pump chambers being set apart by a stationary head intermediate spacedly-connected pistons, one of said pistons being operative in the expansion chamber and the other including a wrist connection to the engine shaft, mechanically actuated valves controlling admission of atmospheric air into the respective pump chambers, a common manifold with individual branches to the several combustion chambers, automatically actuated valves whereby atmospheric air is admitted to the pump chambers for compression therein and supply to said manifold, rotary means in each combustion chamber including a relatively-rotatable sleeve for respectively and variably controlling automatic release of the products of combustion therefrom into the expansion chamber of the associated cylinder and effecting complete scavenging of said combustion chamber, and mechanically actuated valves controlling exhaust from the respective expansion chambers.

7. In a two-cycle engine, multi-cylinders having external-combustion chambers at one end thereof, means for supplying and injecting combustible fuel into said chambers, means in each cylinder defining axially-aligned pump and expansion chambers, said pump chambers being set apart by a stationary head intermediate spacedly-connected pistons, one of said pistons being operative in the expansion chamber and the other including a connection to the engine shaft, mechanically actuated valves controlling admission of atmospheric air into the respective pump chambers, a common manifold with individual branches to the several combustion chambers, valves whereby atmospheric air is admitted to the pump chambers for compression therein and continuous supply to said manifold, rotary means in each combustion chamber controlling admission of compressed air from the manifold to effect ignition of the fuel injected therein, a relatively rotatable sleeve for variably governing release of the products of combustion therefrom into the expansion chamber of the associated cylinder as well as for subsequent auxiliary scavenging of said chamber, mechanically actuated valves controlling exhaust from the respective expansion chambers; and means for variably regulating and coordinatively actuating the air admission valves, combustion chamber rotary means and sleeve, as well as the exhaust valves in synchronized relation, whereby the flexibility of the engine is improved and its reversibility easily effected during inactive strokes of its pistons.

8. In a two-cycle engine, multi-cylinders having individual external-combustion chambers across one end thereof, means for supplying and injecting suitable combustible into said chambers, means in each cylinder defining axially-aligned pump and expansion chambers, said pump chambers being set apart by a stationary head intermediate spacedly-connected pistons, one of said pistons being operative in the expansion chamber and the other including a connection to the engine shaft, mechanically actuated valves controlling admission of atmospheric air into the respective pump chambers, a common manifold with individual branches to the several combustion chambers, automatic valves whereby atmospheric air is admitted to the pump chambers for compression and supply to said manifold, rotary valve in each combustion chamber for variably controlling admission of the compressed air into said chamber to ignite fuel oil injected thereinto and similar release of the products of combustion therefrom into the expansion chamber of the associated cylinder, a ported sleeve on said valve and movable relative thereto for effecting auxiliary scavenging of the combustion chamber, mechanically actuated valves controlling exhaust from the respective expansion chambers; and means coordinatively actuating the air admission valves, combustion chamber rotary valve and sleeve, as well as the exhaust valves in synchronized relation, said last mentioned means including shifter-mechanism whereby the combustion chamber rotary means can be advanced or retarded to vary the time of release of the products of combustion therefrom into the expansion chambers as well as turned to effect reversal of the engine during inactive strokes of said engine.

9. In a two-cycle engine, multi-cylinders having individual external-combustion chambers across one end thereof; means in each cylinder defining axially-aligned pump and expansion chambers; said pump chambers being set apart by a stationary head intermediate spacedly connected pistons, one of said pistons being operative in the expansion chamber and the other including a wrist pin and connecting rod drive to the engine shaft; cam actuated valves controlling admission of atmospheric air into the respective pump chambers for compression therein; automatic valves governing release of the air compressed in said pump chambers; a common manifold with individual connections to the several combustion chambers; a rotary pump and associated injector supplying fuel oil to each combustion chamber; a cylindrical valve rotatable in each combustion chamber with an air inlet port for variably controlling admission of compressed air from the common manifold and an exhaust outlet for release of the products of combustion into the associated cylinder expansion chamber; a ported sleeve on the rotary valve and movable relative thereto for admission of compressed air from the manifold connection into the combustion chamber, and for effecting auxiliary scavenging of said combustion chamber; cam actuated valves controlling exhaust from the respective expansion chambers; means coordinatively operating the air admission valves, combustion chamber cylindrical valves and associated sleeves, fuel pumps and associated injector, and the exhaust valves in synchronized relation; and shifter mechanism whereby the valve and pump operating means can be advanced or retarded while the engine is running normal, or when reversed, and ignition effected at any predetermined time with respect to the position or direction of piston movement, whereby the flexibility of said engine is greatly improved, and it is rendered reversible during inactive strokes of its pistons or while ascending relative to the bottom dead center.

10. The combination of claim 9 wherein the several cam devices comprise diametrically-opposing sectoral sections with intervening mergent inclines, and means whereby said cams are axially shiftable.

11. The combination of claim 9 wherein the combustion chamber cylindrical valve advancing or retarding means comprises gears and a two-part shaft, one section of the latter being confined to definite axial rotation and the other section being capable of rotative helical movement relative to said first mentioned section.

12. The combination of claim 9 wherein the shifter mechanism includes a centrifugal governor, and means operatively connecting said shifter mechanism to the engine crank shaft for automatic movement in accordance with variations in the engine speed.

13. The combination of claim 9 wherein the air inlet valves for the respective pump chambers are arranged in a common housing, said valves having stems alignedly-guided by opposed walls of the housing and spaced spiders, springs influencing said valves inwardly, diametrically opposed sectoral cams on shafts coactive with the valve stems, means whereby said shafts are variably shiftable in an axial direction, and an inlet orifice between the spiders in the housing aforesaid for flow of atmospheric air alternatively through the respective valves.

14. The combination of claim 9 wherein the respective combustion chambers have a semispherical end, the cylindrical valve rotative therein has an open end facing said semi-spherical end of the chamber, and the fuel injector is located centrally of said chamber end.

FRANCIS M. BROOKE.